United States Patent
Dumoulin

(10) Patent No.: US 12,466,099 B2
(45) Date of Patent: Nov. 11, 2025

(54) ELECTROMAGNETIC DRIVE FOR A CUTTING DEVICE OF A TEXTILE MACHINE, CUTTING DEVICE AND YARN CLEARER

(71) Applicant: Saurer Intelligent Technology AG, Arbon (CH)

(72) Inventor: Charles Leopold Elisabeth Dumoulin, Balgach (CH)

(73) Assignee: Saurer Intelligent Technology AG, Arbon (CH)

( * ) Notice: Subject to any disclaimer, the term of this patent is extended or adjusted under 35 U.S.C. 154(b) by 271 days.

(21) Appl. No.: 17/981,122

(22) Filed: Nov. 4, 2022

(65) Prior Publication Data
US 2023/0136281 A1    May 4, 2023

(30) Foreign Application Priority Data
Nov. 4, 2021   (EP) .................................. 21206580

(51) Int. Cl.
*B26D 5/08*    (2006.01)
*H01K 7/06*    (2006.01)
*H02K 7/06*    (2006.01)
*H02K 7/14*    (2006.01)

(52) U.S. Cl.
CPC ................ *B26D 5/086* (2013.01); *H02K 7/06* (2013.01); *H02K 7/14* (2013.01)

(58) Field of Classification Search
CPC .......... B26D 5/086; B26D 1/085; H02K 7/06; H02K 7/14; H02K 26/00; H02K 2201/18; H02K 35/02; H01F 7/1607; H01F 7/081; H01F 2007/163; H01F 2007/086; H01F 3/02; H01F 7/13; B65H 54/71; B65H 2701/31; F23K 5/142; F04B 17/046
USPC ... 83/575, 588, 639.1, 583, 582, 639.7, 649, 83/196, 198
See application file for complete search history.

(56) References Cited

U.S. PATENT DOCUMENTS

| | | | | |
|---|---|---|---|---|
| 3,191,831 A | * | 6/1965 | Bunting, Jr. ........... | B65H 54/71 225/104 |
| 3,267,866 A | * | 8/1966 | Unger ................... | F04B 17/046 417/417 |
| 3,570,353 A | | 3/1971 | Hess | |
| 9,341,182 B2 | * | 5/2016 | Mayoraz ............... | F04B 53/125 |

(Continued)

FOREIGN PATENT DOCUMENTS

| | | |
|---|---|---|
| CH | 699425 B1 | 3/2010 |
| CN | 111301370 A * | 6/2020 |

(Continued)

*Primary Examiner* — Ghassem Alie
(74) *Attorney, Agent, or Firm* — Fox Rothschild LLP

(57) ABSTRACT

An electromagnetic drive for a cutting device of a textile machine for severing a thread, a cutting device having an electromagnetic drive, and a yarn clearer having a cutting device are provided. The electromagnetic drive may comprise a solenoid and a piston configured to drive a cutting blade carrier. The piston may be guided for linear movement within the solenoid and may be configured to be linearly moved between a rest position and a working position. The electromagnetic drive may comprise an axial air gap between an end face of the piston and a counter face of a component of the solenoid. The component may be stationary relative to the piston and the axial air gap may be varier based on movement of the piston.

15 Claims, 1 Drawing Sheet

(56) References Cited

U.S. PATENT DOCUMENTS

Figure 1:
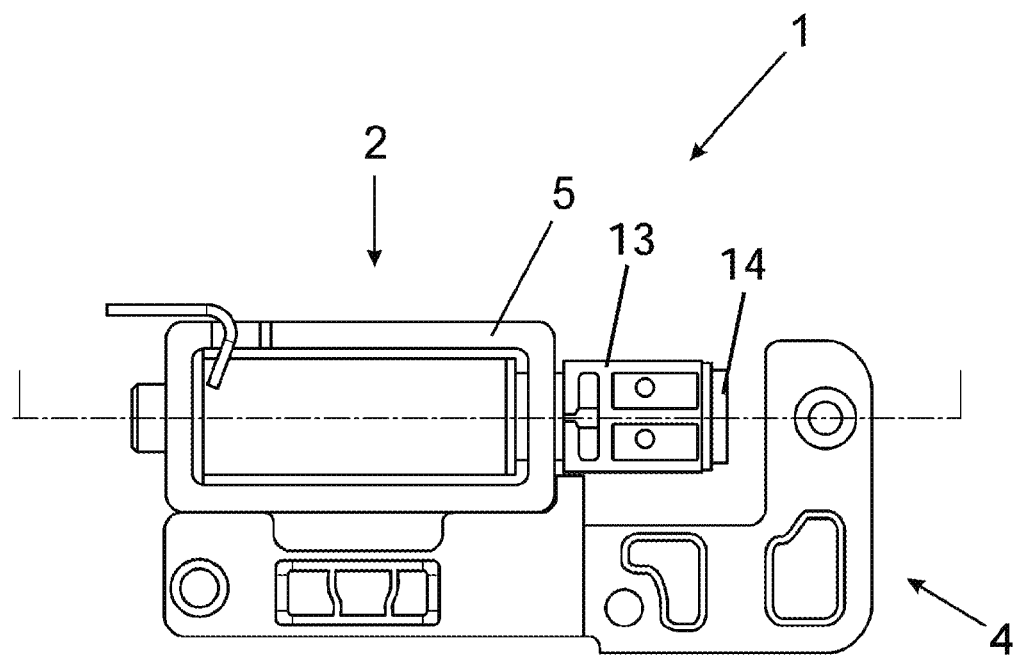

| | | | | |
|---|---|---|---|---|
| 2004/0169989 A1* | 9/2004 | Babich | .................. | H01F 7/1607 |
| | | | | 361/160 |
| 2008/0314238 A1* | 12/2008 | Neuner | ............... | F04B 11/0033 |
| | | | | 92/143 |

FOREIGN PATENT DOCUMENTS

| | | | | | |
|---|---|---|---|---|---|
| CN | 111775176 A | * | 10/2020 | .............. | B25J 17/00 |
| DE | 102015102457 A1 | * | 8/2016 | .............. | B65H 63/02 |
| WO | WO 9003037 A1 | * | 3/1990 | ............... | H01F 7/13 |
| WO | 2009018670 A1 | | 2/2009 | | |

* cited by examiner

ELECTROMAGNETIC DRIVE FOR A CUTTING DEVICE OF A TEXTILE MACHINE, CUTTING DEVICE AND YARN CLEARER

CROSS REFERENCE TO RELATED APPLICATIONS

This application claims, under 35 U.S.C. § 119 (a), the benefit of European Patent Application No. EP21206580.9, filed on Nov. 4, 2021, the disclosure of which is incorporated herein by reference in its entirety.

The invention relates to an electromagnetic drive for a cutting device of a textile machine for severing a thread, to a cutting device having an electromagnetic drive of this type, and to a yarn clearer having a cutting device of this type.

Cutting devices having an electromagnetic drive for a textile machine and of yarn clearers having a corresponding cutting device for a workstation of a textile machine are known, in various designs, from the prior art and are widely used to cut a thread, for example when a yarn fault or yarn defect is detected.

In textile machines with high thread running speeds, the thread must be severed very quickly. A typical cycle of a cutting device or of an electromagnetic drive for moving a cutting blade from a rest position into a cutting position and back into the rest position occurs preferably in less than 15 ms. In addition to the required high speed of the cutting blade and the short duration of the cutting process, it is also required that the cutting blade has a sufficiently large cutting force for properly severing the thread and that the cutting process is carried out cleanly and in a controlled way.

Textile machines that produce take-up packages, such as rotor spinning machines, air-spinning machines and winding machines, are able to wind a large number of yarns with a wide range of thicknesses and materials. The cutting device must be able to cleanly sever thin yarn materials, e.g. with a diameter of 0.05 mm, as well as thick yarn materials, e.g. with a diameter of 1 mm. The spectrum of materials that can be processed ranges from natural fibres to synthetic fibres. Synthetic fibres in particular can be very tough and therefore can be difficult to sever.

Known cutting devices from the prior art have high electrical energy consumption of, in some cases, over 400 W to 500 W while having only moderate cutting performance for yarns, particularly yarns made of synthetic fibres. This leads to processing problems especially when thick places must be cut.

One problem addressed by the present invention is that of lastingly expanding the possible range of diameters and materials that can be cut by the cutting device. At the same time, the economic benefit that can be achieved for a cutting device of this type as a result of a decrease not only in the production costs but also in the operating costs should preferably be taken into consideration. It is also preferred that the maintenance and service intervals of the cutting device are extended in order to decrease the operating costs further. The efficiency of the energy conversion of electrical energy to cutting energy should also preferably be increased in order to increase the cutting performance while also reducing the operating costs. In addition, it should preferably be possible to provide a cutting device requiring less installation space so that the geometric conditions of the installation volume can be better satisfied. To summarise these problems, providing lasting excellent cutting performance together with reduced operating and production costs and reduced installation space can preferably be regarded as an additional problem addressed by the present invention.

The problem addressed by the present invention is solved by means of an electromagnetic drive for a cutting device of a textile machine for severing a thread according to claim 1, by means of a cutting device having an electromagnetic drive according to claim 12, and by means of a yarn clearer having a cutting device according to claim 13. Advantageous further developments of the invention are stated in the dependent claims.

The electromagnetic drive according to the invention for a cutting device of a textile machine for severing a thread comprises a solenoid with a piston, which can be linearly moved within the solenoid and which is designed to drive a cutting blade carrier. The piston can be linearly moved between a rest position and a working position, which is different from the rest position. The solenoid also comprises a coil for producing a magnetic field which drives the piston. Between an end face of the piston and a counter face of a component of the solenoid, said component being stationary relative to the piston, there is an axial air gap which is varied in accordance with the movement of the piston. In other words, when the piston is in the rest position the end face of the piston is spaced apart from the counter face, and this axial distance along the movement direction is varied by movement of the piston toward the counter face, i.e. in the axial direction.

In principle, the solenoid, the electromagnet of the solenoid and in particular the coil of the solenoid can be supplied with power in any way; direct power supply by means of a charged capacitor is preferred. The capacitor is preferably arranged in the region of a cutting device comprising the electromagnetic drive and/or in the region of a control unit of the cutting device.

According to a first aspect, the present invention is characterised in that the piston is partly guided in a core tube contained by the solenoid, the core tube being formed by the component which is stationary relative to the piston. The axial air gap extends between the end face of the piston and an end face of the core tube which is formed by the counter face. At least the end face of the piston or the end face of the core tube is conical. It is also preferred that the end face of the piston and the end face of the core tube correspond to each other. It is particularly preferred that the end face of the piston is conical and that the end face of the core tube corresponds thereto. Here, a corresponding design should be understood to be a design of the mutually corresponding faces such that these faces are congruent when brought one over the other. In other words, the one end face is preferably a negative of the other end face.

Consequently, when the piston is in the rest position, a cavity is formed between the end face of the piston and the counter face, in particular the end face of the core tube, and this cavity is reduced as the piston is moved from its rest position into its working position, which, in particular, can be a cutting position. This cavity is referred to as the axial air gap, which extends in the axial direction of the piston and is varied as the piston is moved in its axial direction. It has been found that the size of this air gap and, in particular, of the faces delimiting the air gap in the axial direction, i.e. the end face and the counter face, is relevant to the functioning and efficiency of the electromagnetic drive. Application of force to the piston occurs, inter alia, as a result of the magnetic flux across this air gap. Therefore, in order to increase the application of force for an existing geometry, the magnetic flux density should be increased and the losses that arise should be minimised, which is preferably achieved by virtue of the enlargement of the air gap as a result of the conical design. The force on the piston that is produced by the magnetic field can thereby be increased.

In order to particularly advantageously increase the surfaces which delimit the air gap in the axial direction and which belong to the components in the region of the air gap, and at the same time to ensure good functioning of the electromagnetic drive and of the cutting device, a preferred design of the electromagnetic drive provides that the angle of the conical end face of the piston and/or an angle of the counter face, in particular of a corresponding end face of the core tube, with respect to the axial movement axis of the piston is from greater than 0° up to and including 50°, preferably from 10° up to and including 45°, particularly preferably from 15° up to and including 40°, more preferably from 25° up to and including 35°, and most preferably 30°.

The angle of the end face of the position preferably refers to the inclination or the angle within the material of the piston and/or of the surface of the end face with respect to the central longitudinal axis of the piston. The angle of the counter face, more particularly the end face of the core tube, preferably refers to the inclination or the angle within the air gap and/or of the surface of the counter face or the end face with respect to the central longitudinal axis of the piston or to the central longitudinal axis of the core tube. Accordingly, the angle of the counter face, in particular in the material of the core tube, is preferably 180° minus the angle of the piston within the material. It is also preferred that the conical part of the piston has a constant angle over the entire end face; however, a design with an angle that varies along the end face and/or an end face of the piston and/or of the stationary component which is divided into a plurality of different portions is also conceivable in principle.

The end face of the piston and the counter face, preferably the end faces of the piston and of the core tube, are preferably mutually correspondingly shaped and/or angled, in particular such that the two end faces can come into complete contact with each other as the axial air gap is closed. It is additionally preferred that the relevant end face of the piston and/or the counter face is smooth or flat.

In principle, the piston and the core tube can be made of any material. Because of the back-and-forth movement of the piston, the piston is preferably made of a material having high magnetic permeability, high saturation magnetisation and also low coercivity, whereby hysteresis losses and increased restoring forces can be avoided. Therefore, according to a preferred design of the electromagnetic drive the piston and/or the core tube is made of a material having a high magnetic saturation level, preferably of more than 1.9 T and particularly preferably of more than 2.0 T, and/or having a low coercive force, preferably of less than 1300 A/m, particularly preferably of less than 1200 A/m, more preferably of less than 800 A/m, and most preferably of less than 700 A/m, whereby the hysteresis losses occurring in the material can advantageously be kept as low as possible. Furthermore, because of the reduced coercive force, a required restoring force of the largely closed magnetic circuit for restoring the initial position or for the assuming of the rest position can be reduced.

According to another preferred embodiment, the piston has a first piston segment and a second piston segment. The first piston segment is arranged outside of the core tube. The second piston segment is fixed to the first piston segment, and a free end of the second piston segment protrudes from the solenoid. In particular, the second piston segment extends from the first piston segment through the core tube. The free end of the second piston segment is designed to carry the cutting blade carrier.

The first piston segment is preferably made of a metal, preferably a carbon steel because of the high saturation magnetisation, particularly preferably a hot-rolled carbon steel, and/or has a carbon content of less than 1%, preferably of less than 0.5%, particularly preferably in a range from 0.05% up to and including 0.3%, more preferably in a range from 0.1% up to and including 0.2%. The smaller the carbon content, the more the coercive force can be reduced; it has been found that an optimal coercive force can be achieved at the particularly preferred carbon content of 0.1% to at most 0.2%.

The core tube, in itself, is not exposed to large forces. However, because of the reduction of the cross-sectional area and the resulting densification of the magnetic flux from the solenoid to the core tube, high saturation magnetisation is required. In order to reduce magnetisation losses of the electromagnetic drive as much as possible, the first piston segment and the core tube are particularly preferably made of the same material. As an additional advantage, the costs of these two parts can thereby be reduced.

It is also preferred that an axial length of the first piston segment is selected such that the axial length is greater than or equal to a simple axial length of an exposed face of the solenoid which faces the first piston segment, the axial length of the exposed face of the solenoid being greater than the axial length of the axial air gap when the piston is in the rest position. Thus, sufficient material thickness for the fixing of the second piston segment to the first piston segment can be provided, together with a low mass of the first piston segment. It is also preferred that the axial length of the first piston segment is greater than or equal to the sum of the simple axial length of the exposed face of the solenoid which faces the first piston segment and the axial length of the axial air gap when the piston is in the rest position. Thus, a magnetic field density acting in an orthogonal air gap between the solenoid and the piston can be kept constant over the entire movement sequence of the piston. For costs reasons, an end of the second piston segment is preferably fixed in a receptacle, more particularly an axial receptacle, of the first piston segment, for example by being pressed in, more particularly axially. Alternative or additional manners of fixing can be selected, as long as it is ensured that the first and second piston segments can be moved conjointly in the axial direction and more preferably can withstand or resist impact forces resulting from the cutting process.

According to a preferred embodiment, the second piston segment is made of a non-magnetic and/or non-magnetisable metal, in particular aluminium or stainless steel. Thus, the risk of a magnetic short circuit can be effectively countered. The preferred design with aluminium or stainless steel also has a favourable corresponding effect on the weight and stability of the piston.

The aforementioned problem is alternatively or additionally solved in that the piston is at least partly hollow. An at least partly hollow design of the piston allows not only an efficient weight reduction but also the reduction of hysteresis losses together with the reduction of eddy current propagation. At the same time, the electromagnetic drive, in particular the piston, can preferably be designed in accordance with one of the preferred embodiments described above. In particular, the first piston segment and/or the second piston segment can be hollow or in the form of a hollow profiled element. Furthermore, the piston or the first piston segment can preferably be hollowed out on a rear side facing away from the cutting blade carrier. The extent of the hollowing out can preferably be selected in such a way that the diameter of the hollow is such that, at the maximally produced cutting force of the electromagnetic drive, the material of the piston or of the first piston segment which surrounds the hollow lies outside of the magnetic saturation.

Furthermore, the problem addressed is alternatively or additionally solved by means of the invention in that the piston is operatively connected to a returning element for returning the piston after the piston has been moved out of the rest position, the returning element having a progressive and, in particular, non-linear spring characteristic curve. At the same time, the electromagnetic drive can preferably be designed according to one of the preferred embodiments described above.

A spring element preferably acts on the piston, the spring element returning the piston toward the rest position and/or against the direction of action of the magnetic field of the coil for accelerating the piston out of the rest position. The spring element is preferably a progressive spring, and the spring force particularly preferably increases non-linearly with increasing compression or deformation of the spring. It is also preferred that the spring element is a coil spring and/or surrounds a piston portion, more particularly a portion of the second piston segment. The spring element can also preferably be at least partly arranged in the core tube or extend at least partly into the core tube. Alternatively, a second core tube can preferably be provided, it being additionally preferred that said second core tube is arranged within the solenoid or within a solenoid core of the solenoid in order to guide a piston portion extending through the core tube. In another preferred embodiment, the solenoid, more particularly the solenoid core, the core tube or the second core tube, can have or form a stop for the spring in order to make the compression effect possible. The spring stop can be provided inside or outside of the core tube or the second core tube.

Furthermore, the problem addressed is alternatively or additionally solved in that the piston is surrounded by a solenoid core, which is stationary relative to the piston and which either is produced by powder injection moulding and/or is made from a soft ferrite or is made from a plurality of layers of an electrical steel sheet, more particularly from a non-grain-oriented electrical steel sheet. At the same time, the electromagnetic drive can preferably be designed according to one of the preferred embodiments described above.

The solenoid core allows improved magnetic flux within the solenoid. The solenoid core preferably has a sufficiently large area through which the magnetic flux can reach the piston and, according to an additionally preferred embodiment, the core tube. The solenoid core preferably is arranged outside of the coil and has a portion which protrudes beyond the coil in the axial direction and which faces, such that an orthogonal air gap is formed, a piston portion, more preferably a portion of the first piston segment and a portion of the core tube. The magnetic field strength can thereby be kept relatively low. In particular, a low magnetic field strength can be achieved in the region of the transitions between the solenoid core and the piston, more preferably both between the solenoid core and the first piston segment and between the solenoid core and the core tube. The piston, more particularly together with the core tube, is arranged coaxially in the interior of the solenoid core.

According to the preferred design, the solenoid core is not exposed to high impact forces. The solenoid core preferably has a large cross-sectional area over which the magnetic flux can be guided. In particular, it is preferred that the transitions between the solenoid core and the piston, more preferably both between the solenoid core and the first piston segment and between the solenoid core and the core tube, are planar such that magnetic saturation is not possible in the region of these transitions. The solenoid core is particularly advantageously made of a soft ferrite material. Soft ferrite contributes to the optimisation of the functioning of the electromagnetic drive. In particular, the use of Mn—Zn ferrite, Ni—Zn ferrite, yttrium iron garnet or the like is advantageous. Production by means of powder injection moulding is also advantageous and allows particularly advantageous magnetic properties and particularly high efficiency of the electromagnetic drive. Alternatively or in addition to a design achieved by means of powder injection moulding, more particularly after powder injection moulding, a sintering process for solidification can be carried out so that the design results in a powder injection-moulded part which is additionally preferably subsequently sintered. As a result of the design as a powder injection-moulded part, more particularly as a sintered powder injection-moulded part, production costs can also be significantly reduced.

In an alternatively preferred design of the solenoid core, the solenoid core is formed from a plurality of layers of an electrical steel sheet, particularly preferably from non-grain-oriented electrical steel sheet, and especially preferably from 3.2% silicon steel sheet or 6.5% silicon steel sheet. In this way, particularly high magnetic permeability and magnetic saturation can be achieved. Furthermore, eddy currents can be largely suppressed by virtue of the layered arrangement. All the material layers preferably have an identical thickness and/or are formed from identical material. It is also preferred that the solenoid core has at least three, particularly preferably at least five, more preferably at least ten and most preferably at least fifteen material layers.

According to a preferred embodiment of the present invention, a magnetically exposed area in the orthogonal air gap between the solenoid core and the piston, more particularly a magnetically exposed area between the solenoid core and the first piston segment and a magnetically exposed area between the solenoid core and core tube, is preferably greater than or equal to the magnetically exposed area, more particularly the end face or the counter face, in the axial air gap, and the magnetically exposed area of the orthogonal air gap between the solenoid core and the piston, more particularly the magnetically exposed area between the solenoid core and the first piston segment and the magnetically exposed area between the solenoid core and core tube, is greater than the end face of the piston or than the counter face in the axial air gap preferably at least by a factor of 2, particularly preferably by a factor of between 2 and 6, more preferably by a factor of between 3 and 5 and most preferably by a factor of about 4. The term "magnetically exposed area" is understood to mean, in particular, the area on which a magnetic field of the solenoid acts, in particular directly, in order to achieve movement of the piston in the axial direction.

The solenoid core is preferably arranged directly facing the piston, more particularly the first piston segment, and preferably also the core tube, such that the orthogonal second air gap is formed. Here, "directly" should be understood to mean that no other physical components or elements which neither are assigned to the core tube or the piston nor are part of the core tube or the piston are interposed.

According to a preferred further development of the electromagnetic drive, the piston, in particular the second piston segment, is arranged so as to be guided within the core tube with minimal orthogonal distance so that a second, orthogonal air gap extending between the piston and a solenoid core surrounding the core tube is kept as small as possible. As a result, the magnetic field strength in the axial air gap can be advantageously increased, whereby the efficiency of the electromagnetic drive and thus a cutting effect of the cutting device are considerably improved. The core tube is preferably formed as a single-piece component and/or as a component which is independent of the other components of the solenoid.

It is also preferred that the core tube has a hollow cylindrical portion, particularly preferably with a constant inside diameter selected in accordance with the outside diameter of the piston or of a guided portion of the piston, in particular of the second piston segment, which guided portion penetrates the core tube.

Furthermore, it is preferred that the electromagnetic drive is designed such that the solenoid has a bearing element, in particular a single bearing element, for supporting the piston, the bearing element particularly preferably being formed of polyetheretherketone (PEEK), whereby particularly good linear guidance with little dynamic friction can be achieved. Furthermore, influencing of the magnetic effect of the coil on the piston can be reliably avoided.

The material of the bearing element preferably has a low coefficient of friction. The bearing element is preferably a bearing sleeve and/or a linear bearing element. It is also preferred that the bearing element surrounds the piston, more particularly a portion of the second piston segment, more particularly in the core tube, especially preferably on all sides and/or closely. It is also preferred that the bearing element is pressed into the core tube.

In a conceivable alternatively preferred design of the bearing element, the bearing element is made of another material, such as bronze, more particularly bearing bronze, silicon bronze or phosphor bronze, brass, copper or another metal, more particularly another non-ferrous metal.

According to another preferred design of the electromagnetic drive, the piston is designed such that the centre of mass of the piston, preferably including the cutting blade carrier, remains within the core tube, in particular within the bearing element, during the maximum possible movement of the piston between the rest position and the working position, which can be the end position such as the cutting position or an intermediate position. As a result, particularly stable and tilting-free support can be achieved in a simple way, and this can directly improve the cutting result by virtue of a defined angle of the impact of the cutting blade and can keep the radial or orthogonal air gap constant and as small as possible during the entire movement of the piston between the rest position and the working position, whereby the magnetic field strength can be kept as large as possible in the axial air gap, said air gap being important for the driving of the piston.

According to another aspect of the present invention, a cutting device for a textile machine for severing a thread is provided, the cutting device comprising an electromagnetic drive according to at least one of the embodiments preferred above and a cutting blade carrier with a cutting blade, the cutting blade carrier being movable by means of the electromagnetic drive between a rest position and a working position such as a cutting position.

A cutting device in the sense of the present invention is a device that can move a cutting blade by means of an electromagnetic drive in such a way that a thread, which is arranged in or on the cutting device and in particular runs past at high speed, can be severed. The cutting device and/or a yarn clearer having a cutting device of this type is preferably an autonomous or independent assembly and/or is designed for arrangement on a textile machine.

The cutting force of a cutting device is directly proportional to the momentum of the moving mass. According to a preferred embodiment, the moving mass is the total mass of the piston, the cutting blade carrier and the cutting blade carried by the cutting blade carrier. During acceleration from a standstill, the momentum imparted to the moving mass is not dependent on the moving mass; rather, it is dependent only on the time integral of the force applied to the moving mass. Therefore, in order to increase the momentum, the velocity should preferably be increased. This can preferably be achieved by reducing the mass of the moving system. The force applied to the piston is also directly dependent on the properties and the efficiency of the solenoid, and therefore an improvement in the efficiency and functioning of the solenoid leads to an improvement in the cutting force and thus in the cutting result. Accordingly, high energy efficiency is desired. In order to increase the force applied to the piston together with the cutting blade, preferably the magnetic flux in the air gap between the piston and the solenoid core should be increased, the losses in the moving system and in the resting system should be minimised, and the necessary restoring forces which restore the moving system after a cut has been made should likewise be minimised.

The piston, the coil and the solenoid core are preferably components of the solenoid. Of these three components, the piston is the only component which is movable; in particular, it is linearly movable. Accordingly, within the cutting device and in particular within the solenoid, the piston is the component that must withstand the greatest impact forces, possibly apart from the cutting blade carrier, and during operation the piston is moved at high velocities, resulting in large forces on this component. The cutting blade carrier and the cutting blade are driven by means of the solenoid by movement of the piston between the rest position and the cutting position along a linear movement path, more particularly a straight movement path, defined by the piston and its movement. The piston preferably is rotationally symmetric in the entire portion arranged within the solenoid and more preferably is rotationally symmetric overall.

In order to be able to move a cutting blade by means of the piston, it is preferred that the cutting blade carrier is arranged at an end of the piston and/or in a region of the piston outside of the solenoid. The cutting blade carrier is a component which is fixed on the piston and the mass of which can be further reduced by preferably designing the cutting blade carrier at least partly as a hollow profiled element.

The cutting blade carrier is basically designed to hold a cutting blade. The cutting blade carrier is preferably designed to exchangeably hold a cutting blade. It is also preferred that the cutting blade carrier secures the cutting blade to prevent the cutting blade from moving in the axial direction and/or in the radial direction as the piston and the cutting blade carrier are moved and/or to prevent tilting of the cutting blade relative to the axial direction of the piston movement. The cutting blade carrier is preferably designed such that the cutting blade is moved linearly in the axial direction or coaxially with the movement direction of the piston between the rest position and the cutting position.

In principle, the cutting blade can be of any design and can have one or more cutting edges. The cutting blade is arranged indirectly or directly on the linearly movable piston and in particular preferably directly on the cutting blade carrier and preferably cuts by means of a cutting movement in the axial direction of the piston. It is also preferred that, in order to sever the thread, the cutting blade cooperates with a counter face, especially preferably with a fixed or stationary counter face; more preferably, the cutting blade cooperates with an anvil in a known way.

According to a preferred embodiment, the cutting device is designed such that the end face and counter face of the electromagnetic drive according to one of the preferred embodiments described above, which end face and counter face are arranged facing each other, do not come into contact and do not touch each other in the cutting position. Consequently, these faces can have a lower hardness; in particular, these faces do not have to be subjected to a hardening process. Furthermore, the risk that the piston adheres to the counter face and thus the return of the piston is delayed or does not occur can be avoided. According to a preferred embodiment, the mutual contact can be prevented by ensuring that the stroke of the cutting device is less than the axial length of the axial air gap.

Finally, the invention relates to a yarn clearer for a workstation of a textile machine, comprising an electromagnetic drive and/or comprising a cutting device according to one of the preferred embodiments above and comprising at least one sensor device for detecting at least the presence or absence of a thread and/or for detecting a yarn fault.

In principle, the textile machine can be any device which produces or processes at least one thread, the textile machine preferably having numerous workstations, in particular workstations lined up one next to the other. The textile machine particularly preferably is a spinning machine, or is a textile machine that produces or rewinds take-up packages, such as, in particular, a rotor spinning machine, an air-spinning machine or a winding machine.

In principle, the yarn clearer can be of any design. The yarn clearer is provided for monitoring and/or processing the thread which is led past, in particular for cutting out faulty portions. Accordingly, the yarn clearer comprises, preferably between a thread entry and a thread exit and in particular in a thread guiding channel, at least one unit for monitoring and/or processing the thread. In particular, the yarn clearer comprises a cutting device according to one of the preferred embodiments in order to clear detected yarn defects and/or yarn faults, i.e. in order to remove a faulty portion.

The above designs, in particular geometric designs, of the parts according to one of the preferred embodiments of the present invention, in combination with a suitable choice of material, largely prevent eddy current losses and hysteresis losses that arise during the dynamic conversion of the supplied electrical energy into kinetic energy. Furthermore, magnetic restrictions such as saturation and residual magnetism (coercivity) can be improved as a result of the selection of the materials and geometries which are used. Improved acceleration of the piston can be achieved as a result of a reduction of the mass, whereby ultimately the cutting performance can be improved. In addition, the required restoring force, in particular at the end of a cutting process, for returning the piston can be reduced by virtue of a reduction in the coercivity. Furthermore, the required restoring force can be further decreased as a result of a reduction of the moving mass. In order to further optimise the drive, the spring element used as the returning element is preferably designed such that the spring force acting against the acceleration during the acceleration phase is minimised.

The present invention is not limited to the individual embodiments described above. Individual or several embodiments can certainly be combined with each other, whereby an additional preferred embodiment can be achieved.

Figure 2:
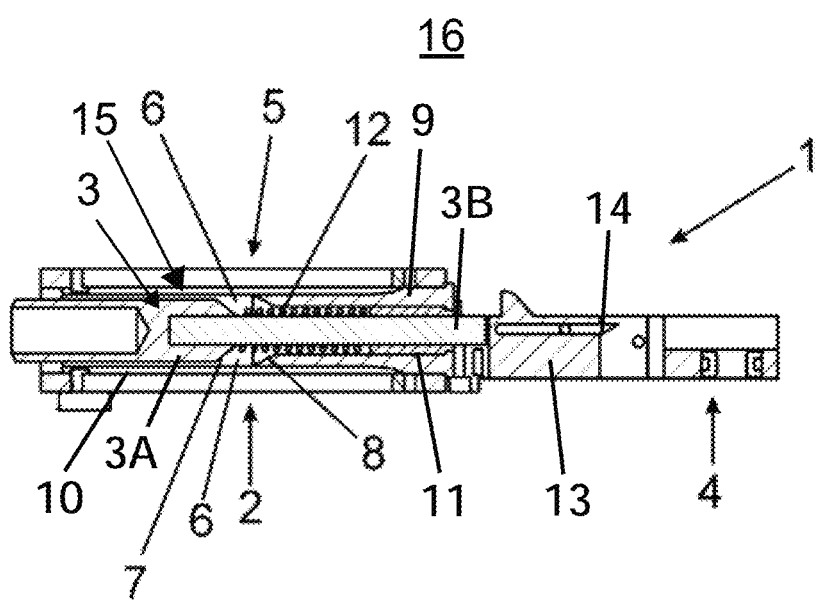

An embodiment example of an electromagnetic drive for a cutting device of a textile machine is explained in more detail below with reference to the drawings. In the drawings:

FIG. 1 shows a schematic view of the top of an electromagnetic drive for a cutting device of a textile machine and FIG. 2 shows a sectional view of the electromagnetic drive shown in FIG. 1.

An electromagnetic drive 1 shown in FIG. 1 is provided for a cutting device 16 of a textile machine that produces thread packages, and said electromagnetic drive 1 has a cutting blade holder 4 for holding the cutting device on a yarn clearer. By means of a cutting blade 14, which is integrated in a cutting blade carrier 13, a thread moving quickly along its central longitudinal axis can be cut or severed, for example when a defect is detected. Because of the high thread running speed, the cutting process must be carried out within a few milliseconds, and therefore particularly fast driving of the cutting blade 14 is required. Furthermore, a certain cutting force and also high precision are required in order to cleanly sever the thread.

In order to make this possible, the electromagnetic drive 1 has a solenoid 2. A piston 3 is linearly movably arranged in the interior of a solenoid core 5. The piston 3 is composed of a first piston segment 3A and a second piston segment 3B, and a free end of the second piston segment 3B is pressed into a receptacle of the first piston segment 3A and thus is fixed.

The piston 3 is partly surrounded by a coil, which is not shown in the figures. When the coil is activated, a magnetic field is built up and the piston 3 is moved toward a cutting position. In order to support the piston 3 on the solenoid core 5 precisely and also with minimal friction, the piston 3 is arranged within a core tube 9, into which additionally a bearing element 11 made of polyetheretherketone is pressed. The bearing element 11 linearly guides the piston 3 and prevents tilting.

The cutting blade carrier 13 is detachably connected to the piston 3, in particular to the other free end of the second piston segment 3B.

In order to achieve particularly good magnetic interaction between the stationary core tube 9 and the piston 3, the end faces 7, 8 of both the piston 3 or the first piston segment 3A and the core tube 9 are conical. The magnetic interaction between the stationary core tube 9 and the piston 3 occurs primarily within an axial air gap 6, which extends between the end face 7 of the piston 3, which end face 7 is angled with respect to the central longitudinal axis of the piston 3, and the corresponding, likewise angled end face 8 of the core tube 9. The axial air gap 6 changes its volume and its length along the central longitudinal axis or the direction of movement of the piston 3 as the piston 3 is moved from a rest position into a cutting position, in which the thread is severed. The first piston segment 3A may comprise an axial length greater than or equal to an axial length of an exposed face 15 of the solenoid 2 which faces the first piston segment 3A. The axial length of the exposed face 15 of the solenoid 2 may be greater than an axial length of the axial air gap 6 when the piston 3 is in the rest position.

The two end faces 7, 8 have a flat surface angled by about 30° with respect to the central longitudinal axis of the piston 3, whereby the surfaces are considerably enlarged in comparison with arrangement at an angle of 90°. In this way, the magnetic interaction can be considerably optimised. In order to optimise this interaction further, the bearing element 11, the piston 3 and the solenoid core 5 are formed such that the orthogonal air gap 10 between the piston 3 and the solenoid core 5, which orthogonal air gap 10 surrounds the piston 3 over the full periphery, and the volume of which orthogonal air gap 10 essentially does not change as the piston 3 is moved, is as small as possible.

As described above, the second piston segment 3B is fixedly set, more particularly pressed, into the first piston segment 3A. The second piston segment 3B is guided in the axial direction by the bearing element 11. Furthermore, the second piston segment 3B is partly hollow or at least partly in the form of a hollow profiled element, and this contributes to further reduction of the moving mass, whereby better acceleration of the moving mass is achieved, leading, in turn, to greater cutting force. In order to avoid magnetic short circuits, the second piston segment 3B is produced from non-magnetic and/or non-magnetisable material, more particularly aluminium or non-magnetic stainless steel. At the same time, the hollowing out of the first piston segment 3A on the side of the piston 3 remote from the second piston segment 3B reduces the eddy current losses and magnetisation losses arising there.

In order to allow the piston 3 to be reliably and quickly returned from the cutting position to the rest position, a progressive coil spring 12 is arranged surrounding the second piston segment 3B and is increasingly loaded as the piston 3 is moved into the cutting position. As soon as the coil is deactivated, the coil spring 12 presses the piston 3 back into the rest position. A movement cycle of an electromagnetic movement of the piston 3 from the rest position into the cutting position and a spring-force-driven movement of the piston 3 back into the rest position is preferably carried out within 10 ms to at most 15 ms. The coil spring 12 is arranged between the end face 7 of the piston 3 and a spring stop provided in the core tube 9, the spring stop being designed for contact at least in the course of the movement of the piston 3 from the rest position into the cutting position. In another preferred arrangement, the coil spring 12 is retained between the end face 7 of the piston 3 and an end face of the bearing element 11.

In order to further optimise the magnetic interaction, the first piston segment 3A and the core tube 9 are made of a material having a high magnetic saturation level of more than 1.9 T and having a low coercive force of less than 800 A/m. In this embodiment of the electromagnetic drive 1, hot-rolled carbon steel having a low carbon content of 0.1% to 0.2% is used as the material of the first piston segment 3A and of the core tube 9.

Furthermore, the solenoid core 5 is formed from a plurality of mutually joined layers of electrical steel sheet, more particularly from non-grain-oriented electrical steel sheet. In another preferred arrangement, the solenoid core 5 is made of a soft ferrite, more particularly Mn—Zn ferrite, Ni—Zn ferrite, yttrium iron garnet or the like, and production by powder injection moulding is particularly advantageous. These measures help, inter alia, to reduce eddy currents and their negative effects on quick acceleration of the piston 3 such that there is no longer any significant effect.

LIST OF REFERENCE SIGNS

1 Electromagnetic drive
2 Solenoid
3 Piston
3A First piston segment
3B Second piston segment
4 Cutting blade holder
5 Solenoid core
6 Axial air gap
7 End face of the piston
8 Counter face or end face of the core tube
9 Core tube
10 Orthogonal air gap
11 Bearing element
12 Returning element/coil spring
13 Cutting blade carrier
14 Cutting blade

The invention claimed is:

1. An electromagnetic drive (1) for a cutting device of a textile machine, the electromagnetic drive (1) comprising:
 a solenoid (2);
 a piston (3) configured to drive a cutting blade carrier (13), wherein:
  the piston (3) is guided for linear movement within the solenoid (2), and
  the piston (3) is configured to be linearly moved between a rest position and a working position; and
 an axial air gap (6), between an end face (7) of the piston (3) and an end face (8) of a core tube (9) of the solenoid (2), wherein:
  the core tube (9) is stationary relative to the piston (3), and
  the axial air gap (6) is varied based on movement of the piston (3), and
 wherein:
  the piston (3) is at least partly hollow, and
  the piston (3) has a first piston segment (3A) and a second piston segment (3B),
 wherein:
  the first piston segment (3A) is positioned outside of the core tube (9),
  the second piston segment (3B) is fixed to the first piston segment (3A),
  a free end of the second piston segment (3B) protrudes from the solenoid (2) and extends from the first piston segment (3A) through the core tube (9),
  the free end of the second piston segment (3B) is configured to carry the cutting blade carrier (13), and
  the first piston segment (3A) is hollow on a side facing away from the cutting blade carrier (13), forming a chamber configured to receive a portion of the second piston segment (3B).

2. The electromagnetic drive (1) according to claim 1, wherein the first piston segment (3A) or the core tube (9):
 comprises a hot-rolled carbon steel; or
 has a carbon content:
  of less than 1%;
  of less than 0.5%; or
  in a range from 0.1% to 0.2%.

3. The electromagnetic drive (1) according to claim 1, wherein the second piston segment (3B) comprises a non-magnetic or non-magnetisable metal.

4. The electromagnetic drive (1) according to claim 1, wherein an angle of the conical end face (7) of the piston (3) or an angle of a corresponding end face (8) of the core tube (9), with respect to an axial movement axis of the piston (3), is between 15° and 40°.

5. The electromagnetic drive (1) according to claim 1, wherein the piston (3) is positioned so as to be guided within the core tube (9) with a minimal orthogonal distance so that a second, orthogonal air gap (10), extending between the piston (3) and a solenoid core (5) surrounding the core tube (9), is minimized.

6. The electromagnetic drive (1) according claim 1, further comprising a single bearing element (11), positioned in the core tube (9), configured to support the piston (3),
wherein the bearing element (11) comprises polyetheretherketone.

7. The electromagnetic drive (1) according to claim 1, wherein a center of mass of the piston (3) remains within the core tube (9) within a bearing element (11) positioned in the core tube (9), during a movement of the piston (3) between the rest position and the working position.

8. The electromagnetic drive (1) according to claim 1, wherein an exposed area in an orthogonal air gap (10) between a solenoid core (5) of the solenoid (2) and the piston (3) is greater than or equal to an exposed area in the axial air gap (6).

9. The electromagnetic drive (1) according to claim 1, wherein the piston (3) or the core tube (9) comprises a material having:
a magnetic saturation level of more than 1.9 T; or
a coercive force of less than 1,300 A/m.

10. A cutting device (16) for a textile machine for severing a thread, comprising:
an electromagnetic drive (1) according to claim 1; and
the cutting blade carrier (13) with a cutting blade (14),
wherein the cutting blade carrier (13) is movable by means of the electromagnetic drive (1) between the rest position and the working position.

11. The electromagnetic drive (1) according to claim 1, wherein the piston (3) is surrounded by a solenoid core (5), which is stationary relative to the piston (3), and which is produced by powder injection molding, or is made from a soft ferrite.

12. The electromagnetic drive (1) according to claim 1, wherein the end face (7) of the piston (3) is conical and is configured to receive the end face (8) of the core tube (9).

13. The electromagnetic drive (1) according to claim 1, wherein the piston (3) is partly guided in core tube (9).

14. The electromagnetic drive (1) according to claim 1, wherein the piston (3) is operatively connected to a returning element (12) configured to return the piston (3) after the piston (3) has been moved out of the rest position.

15. The electromagnetic drive (1) according to claim 14, wherein the returning element (12) comprises a progressive and non-linear spring characteristic curve.

* * * * *